(12) United States Patent
Deng

(10) Patent No.: US 12,142,903 B2
(45) Date of Patent: Nov. 12, 2024

(54) WATERPROOF SEALING MECHANISM FOR MOTOR CABLE OF SWIMMING POOL ROBOTS

(71) Applicant: Shenzhen Seauto Technology Co., Ltd., Guangdong (CN)

(72) Inventor: Zhuoming Deng, Shenzhen (CN)

(73) Assignee: Shenzhen Seauto Technology Co., Ltd., Guangdong (CN)

( * ) Notice: Subject to any disclaimer, the term of this patent is extended or adjusted under 35 U.S.C. 154(b) by 0 days.

(21) Appl. No.: 18/009,307

(22) PCT Filed: Oct. 23, 2022

(86) PCT No.: PCT/CN2022/126874
§ 371 (c)(1),
(2) Date: Dec. 8, 2022

(87) PCT Pub. No.: WO2024/082317
PCT Pub. Date: Apr. 25, 2024

(65) Prior Publication Data
US 2024/0275149 A1   Aug. 15, 2024

(30) Foreign Application Priority Data
Oct. 17, 2022  (CN) .......................... 202222725297.0

(51) Int. Cl.
*H02G 3/08* (2006.01)
*E04H 4/16* (2006.01)
(52) U.S. Cl.
CPC .......... *H02G 3/088* (2013.01); *E04H 4/1654* (2013.01); *H02G 3/083* (2013.01)
(58) Field of Classification Search
CPC ................................................ H02G 3/088
See application file for complete search history.

(56) References Cited

U.S. PATENT DOCUMENTS

2016/0294170 A1* 10/2016 Thomas ................. H02G 3/08

FOREIGN PATENT DOCUMENTS

| CN | 2762426 | * | 3/2006 |
| CN | 115800178 | * | 3/2023 |
| CN | 218582233 | * | 3/2023 |

* cited by examiner

*Primary Examiner* — Hung V Ngo
(74) *Attorney, Agent, or Firm* — ScienBiziP, P.C.

(57) ABSTRACT

The present invention provides a waterproof sealing mechanism for motor cable of swimming pool robots, which comprising a housing, wherein a sealing groove is provided on the outer side of the housing, and a sealing protrusion is integrally provided at the bottom of the sealing groove, connecting wire hole located inside the sealing protrusion is provided at the bottom of the sealing groove, and a sealing soft body is provided inside the sealing groove, the top of the sealing groove is provided with a rubber pressing plate mounted on the housing, and the middle part of the sealing soft body is provided with a threading hole running through the sealing soft body, the middle part of the rubber pressing plate is provided with a threading hole running through the rubber pressing plate, the sealing soft body is installed in the sealing groove, the soft rubber is pressed at the bottom of the fixing base main body, so that the soft rubber deforms to shrink the wire threading hole, and the leads is tightly wrapped in the soft rubber so as to prevent leakage at the penetrating position of the leads, at the same time, the sealing protrusion abuts against and closely contacts the bottom of the soft rubber to prevent the liquid from leaking from the gap between the sealing groove and the sealing soft body.

6 Claims, 5 Drawing Sheets

WATERPROOF SEALING MECHANISM FOR MOTOR CABLE OF SWIMMING POOL ROBOTS

TECHNICAL FIELD

The present disclosure relates to the technical field of swimming pool robots, specifically relates to a waterproof sealing mechanism for motor cable of swimming pool robots.

BACKGROUND ART

The swimming pool cleaning robots are automatic device capable of autonomously finishing the cleaning work of the pool bottom under water. It can help people easily clean up daily garbage and dirt at the bottom of swimming pool, completely changing the previous manual cleaning way, so that the cleaning work becomes no longer troublesome. In order to realize the function of autonomously cleaning under water, in addition to good water-proof performance, the robot also needs a pair of "eyes" capable of route recognition, and this pair of eyes are path navigation systems thereof. Generally, such kind of navigation system uses a measurement manner in which an acceleration sensor and a gyroscope are combined to acquire a trajectory of a moving object, so as to control the movement trend thereof.

In order to realize the function of autonomously cleaning under water, the robot should not only have its own path navigation system, but also have good waterproof performance. The motor mounting base used by the existing swimming pool robot is generally sealed by sealing ring between the motor and the mounting base; however, the sealing of motor leads is performed by splicing two pieces of flexible materials provided with wire holes, but the sealing position is not tight enough, which probably causes leakage, thereby causing damage to the swimming pool robots.

SUMMARY OF DISCLOSURE

The present invention provides a waterproof sealing mechanism for motor cable of swimming pool robots to solve the disadvantages existing in the prior art.

The present disclosure provides am improved method of cleaning water surface of swimming pools and a cleaning robot.

In order to achieve the above object, the present invention adopts the following technical solutions: A waterproof sealing mechanism for motor cable of swimming pool robots comprising a housing, wherein a sealing groove is provided on an outer side of the housing, and a sealing protrusion is integrally provided at the bottom of the sealing groove, connecting wire hole located inside the sealing protrusion is provided at the bottom of the sealing groove, and a sealing soft body is provided inside the sealing groove, and a sealing soft body is provided inside the sealing groove, the top of the sealing groove is provided with a rubber pressing plate mounted on the housing, and the middle part of the sealing soft body is provided with a threading hole running through the sealing soft body, and the middle part of the rubber pressing plate is provided with a fixing wire hole running through the rubber pressing plate.

Preferably, the peripheral surface of the sealing groove is integrally provided with a screw fixing pillar, the bottom of the screw fixing pillar is integrally connected to the housing, and the rubber pressing plate is fixedly mounted with the housing via the screw fixing pillar.

Preferably, the rubber pressing plate comprises a fixing seat main body, a chamfer protrusion, a fixing wire hole, a fixing pin and a bolt hole, the fixing seat main body is located right above the sealing groove, and the fixing pin is integrally connected to the peripheral surface of the fixing seat main body, the bolt hole is provided at one end of the fixing pin away from the fixing seat main body, and the bolt hole is aligned with the screw fixing pillar, the chamfer protrusion are integrally connected to the bottom of the fixing seat main body, and the chamfer protrusion abut against the top of the sealing soft body, the fixing wire hole is arranged in the middle portion of the fixing seat main body, and the fixing wire hole penetrates through the fixing seat main body.

Preferably, the main body of the sealing soft body is soft rubber, the top of the peripheral surface of the soft rubber 31 is provided with a chamfered bevel, and the chamfered bevel abuts against the bevel of the chamfer protrusion.

Preferably, the chamfer of the chamfered bevel is smaller than the chamfer of the chamfer protrusion.

Preferably, the fixed pins are five short rods uniformly arranged by taking the axis of the fixed seat main body as the center of a circle, the angle between adjacent fixed pins is 72 degrees, and a reinforcing rib is integrally provided on the body side of the fixed pins.

Feature Effects of Disclosure

Compared with the prior art, the ADVANTAGEOUS EFFECTS of the present invention are followings:

1). A sealed mounting seat for motor of the swimming pool robot, wherein a sealing soft body is mounted in a sealed groove, and then leads of the motor successively pass through a fixing wire hole of a rubber pressing plate, a wire threading hole of the sealing soft body and a connection wire hole, and then fix the bolt holes of the fixed pin of the rubber pressing plate with the screw fixing pillars, so that the bottom of the fixing seat main body squeezes the soft rubber, so that the soft rubber deforms to shrink the wire threading hole, and the leads is tightly wrapped in the soft rubber so as to prevent leakage at the penetrating position of the leads, at the same time, the sealing protrusion abuts against and closely contacts the bottom of the soft rubber to prevent the liquid from leaking from the gap between the sealing groove and the sealing soft body.

2). The sealed mounting seat for motor of the swimming pool robot is integrally connected to the chamfer protrusion at the bottom of the fixing seat main body, When the rubber pressing plate is installed and pressed down, the bevel of the chamfer protrusion is in contact with and tightly pressed against the chamfered bevel, the chamfer protrusion prevents the soft rubber from overflowing from the joint between the rubber pressing plate and the sealing groove under the effect of the pressure, at the same time, the soft rubber is squeezed towards the middle position, so that the soft rubber is better deformed.

DESCRIPTION OF EMBODIMENTS

Hereinafter, the technical solutions in the embodiments of the present invention will be described clearly and completely with reference to the drawings of the embodiments of the present invention. Obviously, the embodiments described are only partial embodiments of the present invention, rather than all of the embodiments. Based on the embodiments of the present invention, all other embodiments obtained by those skilled in the art without creative efforts all belong to the scope of protection of the present invention.

EMBODIMENTS

Figure 1:
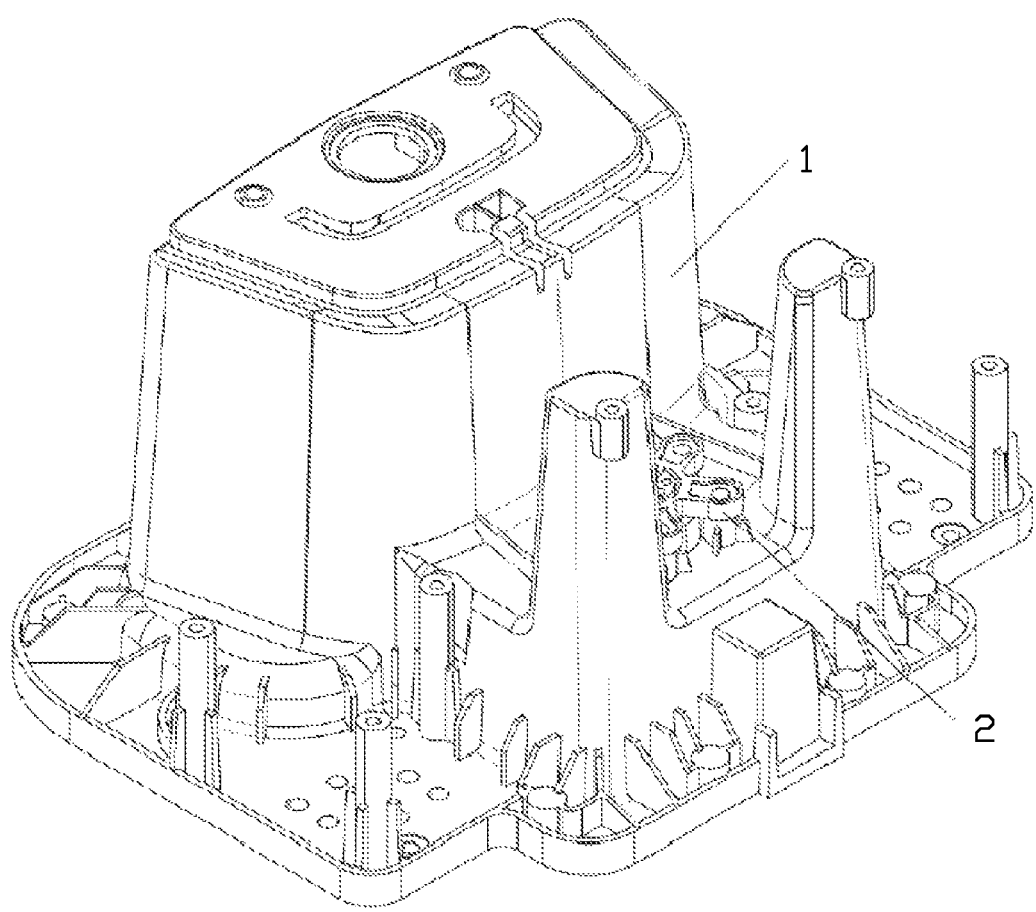
FIG. 1 is an integral structural schematic view of a waterproof sealing mechanism for motor cable of swimming pool robots according to the present invention.
Figure 2:
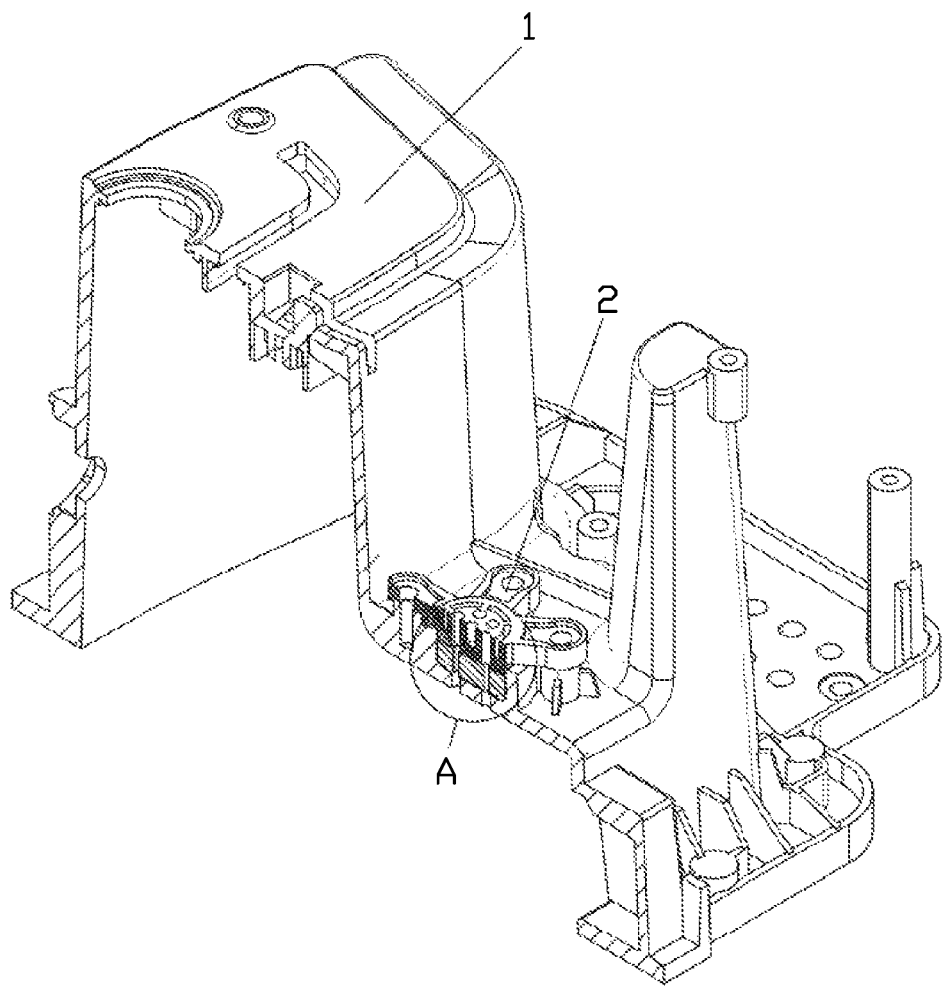
FIG. 2 is a sectional view of a waterproof sealing mechanism for motor cable of swimming pool robots according to the present invention.
Figure 3:
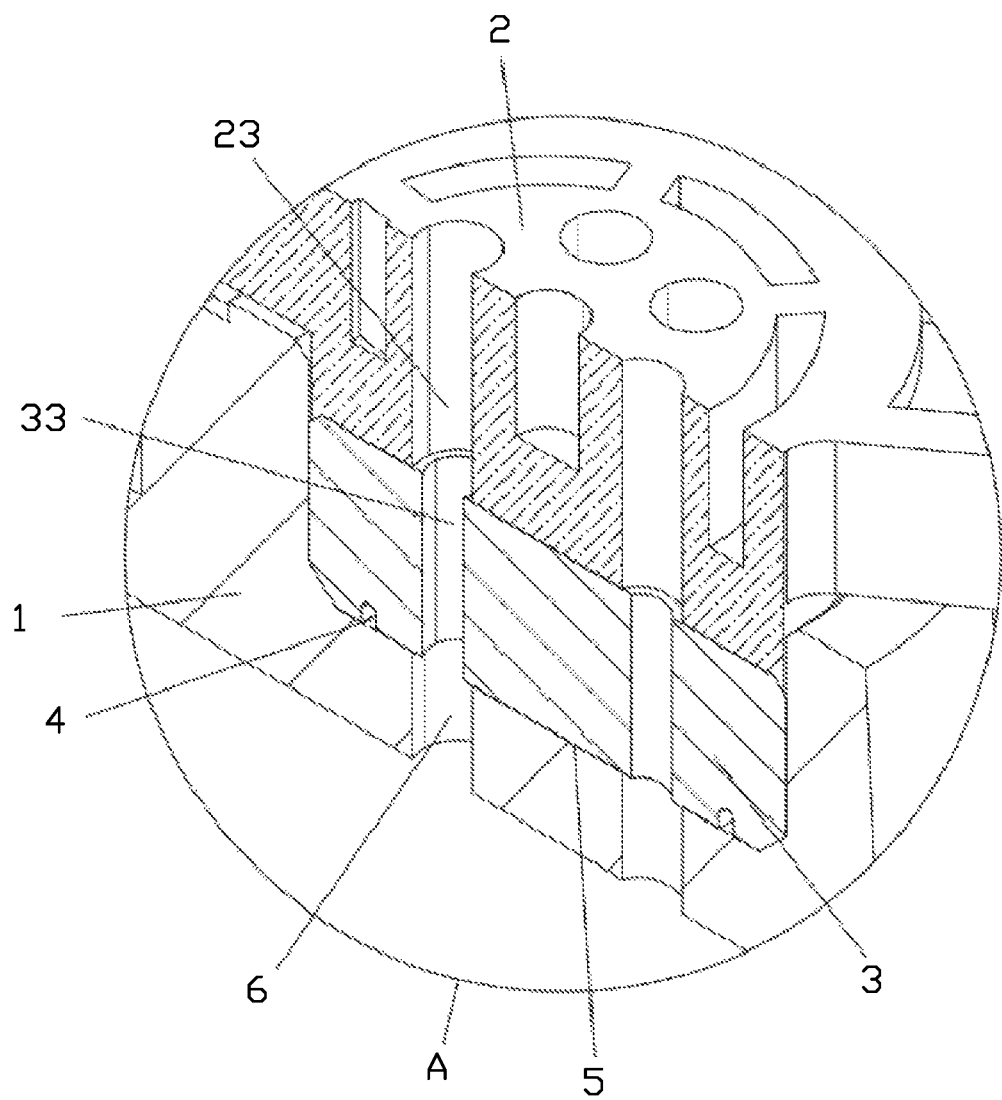
FIG. 3 is an enlarged view of position A in FIG. 2 of a waterproof sealing mechanism for motor cable of swimming pool robots in the present invention.
Figure 4:
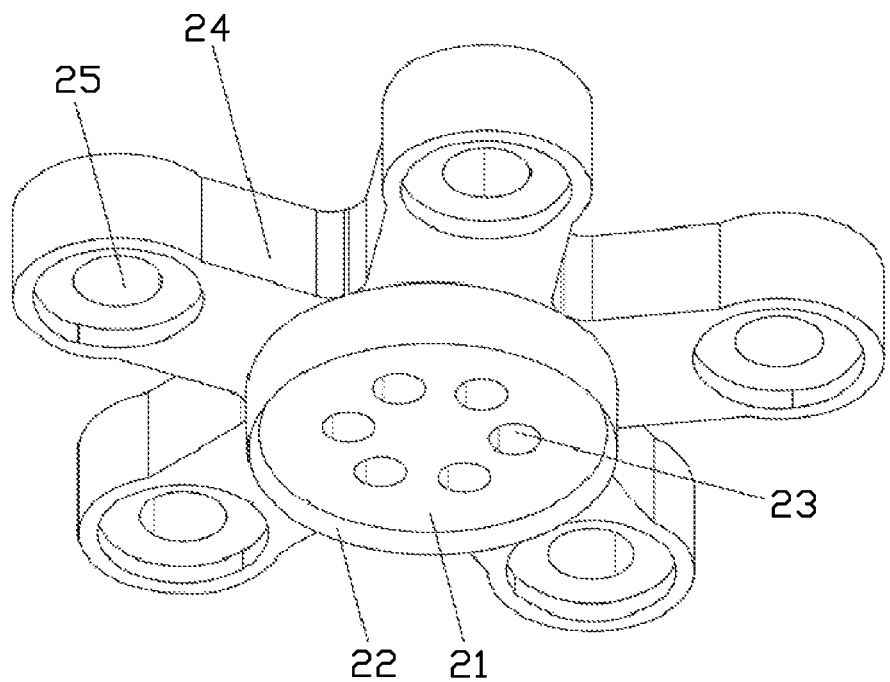
FIG. 4 is a structural schematic diagram of a rubber pressing plate of a waterproof sealing mechanism for motor cable of swimming pool robots according to the present invention.
Figure 5:
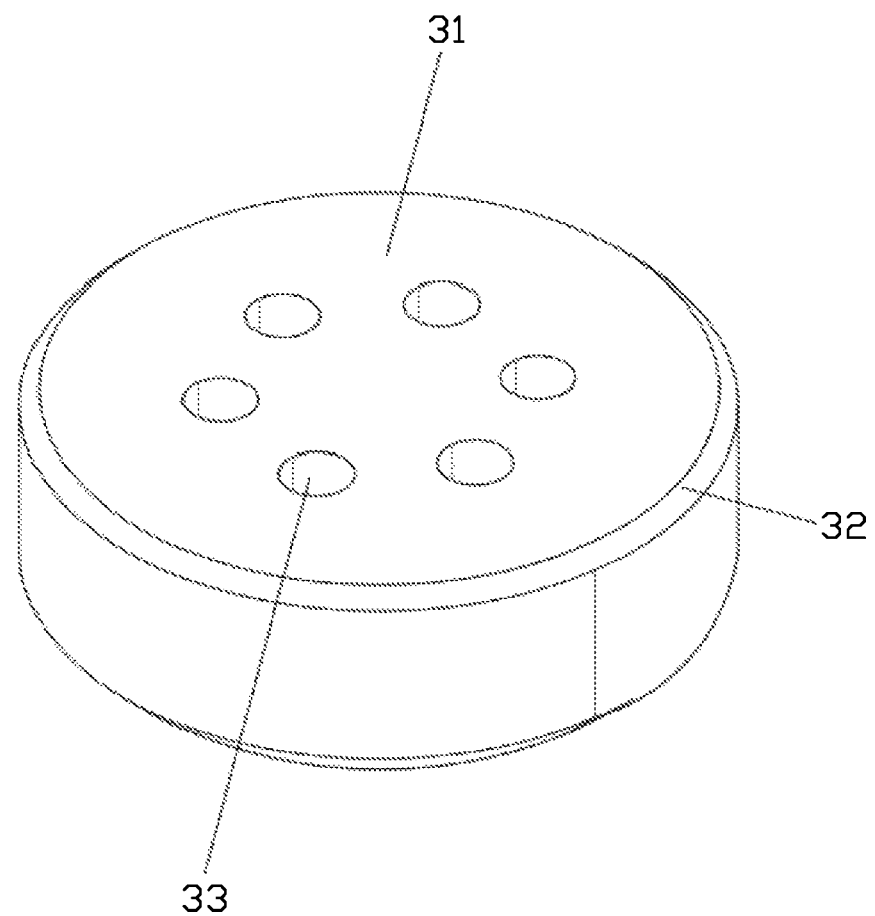
FIG. 5 is a structural schematic view of a sealing soft body of a waterproof sealing mechanism for a motor cable of a swimming pool robot according to the present invention.

Referring to FIGS. 1 to 6, the present invention provides a waterproof sealing mechanism for motor cable of swimming pool robots, comprising a housing 1, wherein a sealing groove 5 is provided on the outer side of the housing 1, and a sealing protrusion 4 is integrally provided at the bottom of the sealing groove 5, connecting wire hole 6 located inside the sealing protrusion 4 is provided at the bottom of the sealing groove 5, and a sealing soft body 3 is provided inside the sealing groove 5, the top of the sealing groove 5 is provided with a rubber pressing plate 2 mounted on the housing 1, and the middle part of the sealing soft body 3 is provided with a threading hole 33 running through the sealing soft body 3, and the middle part of the rubber pressing plate 2 is provided with a a fixing wire hole 23 running through the rubber pressing plate 2, a sealing soft body 3 is mounted in a sealed groove 5, and then leads of the motor successively pass through a fixing wire hole 23 of a rubber pressing plate 2, a wire threading hole 6 of the sealing soft body 3 and a connection wire hole 6, and then fix the bolt holes 25 of the fixed pin 24 of the rubber pressing plate 2 with the screw fixing pillars, so that the bottom of the fixing seat main body 21 squeezes the soft rubber 31, so that the soft rubber 31 deforms to shrink the wire threading hole 33, and the leads is tightly wrapped in the soft rubber so as to prevent leakage at the penetrating position of the leads.

The Peripheral surface of the sealing groove 5 is integrally provided with a screw fixing pillar, the bottom of the screw fixing pillar is integrally connected to the housing 1, and the rubber pressing plate 2 is fixedly mounted with the housing 1 via the screw fixing pillar.

The rubber pressing plate 2 comprises a fixing seat main body 21, a chamfer protrusion 22, a fixing wire hole 23, a fixing pin 24 and a bolt hole 25, the fixing seat main body 21 is located right above the sealing groove 5, and the fixing pin 24 is integrally connected to the peripheral surface of the fixing seat main body 21, the bolt hole 25 is provided at one end of the fixing pin 24 away from the fixing seat main body 21, and the bolt hole 25 is aligned with the screw fixing pillar, the chamfer protrusion 22 are integrally connected to the bottom of the fixing seat main body 21, and the chamfer protrusion 22 abuts against the top of the sealing soft body 3, the fixing wire hole 23 is arranged in the middle portion of the fixing seat main body 21, and the fixing wire hole 23 penetrates through the fixing seat main body 21.

The main body of the sealing soft body 3 is soft rubber 31, and the top of the peripheral surface of the soft rubber 31 is provided with a chamfered bevel 32, the chamfered bevel 32 abuts against the bevel of the chamfer protrusion 22, and is integrally connected to the chamfer protrusion 22 at the bottom of the fixing seat main body 21, When the rubber pressing plate 2 is installed and pressed down, the bevel of the chamfer protrusion 22 is in contact with and tightly pressed against the chamfered bevel, the chamfer protrusion 22 prevents the soft rubber 31 from overflowing from the joint between the rubber pressing plate 2 and the sealing groove 5 under the effect of the pressure, at the same time, the soft rubber 31 is squeezed towards the middle position, so that the soft rubber 31 is better deformed.

The fixed pins 24 are five short rods uniformly arranged by taking the axis of the fixed seat main body 21 as the center of a circle, the angle between adjacent fixed pins 24 is 72 degrees, and a reinforcing rib is integrally provided on the body side of the fixed pins 24.

The working principle is as follows: the sealing soft body 3 is installed in the sealing groove 5, and wires of the motor pass through the fixing wire hole 23 of the rubber pressing plate 2, the wire threading hole 33 of the sealing soft body 3 and the connecting wire hole 6 in sequence, the bolt holes 25 for fixing the pins 24 on the rubber pressing plate 2 are fixedly mounted with the screw fixing pillars, so that the soft rubber 31 is pressed at the bottom of the fixing base main body 21, furthermore, the bevel of the chamfer protrusion 22 is in contact with and tightly pressed against the chamfered bevel, the chamfer protrusion 22 prevents the soft rubber 31 from overflowing from the joint between the rubber pressing plate 2 and the sealing groove 5 under the effect of the pressure, at the same time, the soft rubber 31 is squeezed towards the middle position, so that the soft rubber 31 is better deformed, so that the soft rubber 31 deforms to shrink the wire threading hole 33, and the leads is tightly wrapped in the soft rubber 31 so as to prevent leakage at the penetrating position of the leads, at the same time, the sealing protrusion 4 abuts against and closely contacts the bottom of the soft rubber 31 to prevent the liquid from leaking from the gap between the sealing groove 5 and the sealing soft body 3.

Although embodiments of the present invention have been shown and described, it would be appreciated by those skilled in the art that changes, modifications, alternatives and modifications can be applied to these embodiments without departing from the principle and spirit of the present invention, and the scope of the present invention is defined by the claims and their equivalents.

REFERENCE SIGNS LIST

1 Housing
2 Rubber Pressing Plate
21 Fixing Seat Main Body
22 Chamfer Protrusion
23 Fixing Wire Hole
24 Fixing Pin
25 Bolt Hole
3 Sealing Soft Body
31 Soft Rubber
32 Chamfered Bevel
33 Wire Threading Hole
4 Sealing Protrusion 5 Sealing Groove
6 Connecting Wire Hole

What is claimed is:

1. A waterproof sealing mechanism for motor cable of swimming pool robots comprising
a housing (1), wherein a sealing groove (5) is provided on an outer side of the housing (1), and a sealing protrusion (4) is integrally provided at the bottom of the sealing groove (5), connecting wire hole (6) located inside the sealing protrusion (4) is provided at the bottom of the sealing groove (5), and a sealing soft body (3) is provided inside the sealing groove (5), the top of the sealing groove (5) is provided with a rubber pressing plate (2) mounted on the housing (1), and the middle part of the sealing soft body (3) is provided with a threading hole (33) running through the sealing soft body (3), and the middle part of the rubber pressing plate (2) is provided with a fixing wire hole (23) running through the rubber pressing plate (2).

2. The waterproof sealing mechanism according to claim 1, wherein the peripheral surface of the sealing groove (5) is integrally provided with a screw fixing pillar, the bottom of the screw fixing pillar is integrally connected to the housing (1), and the rubber pressing plate (2) is fixedly mounted with the housing (1) via the screw fixing pillar.

3. The waterproof sealing mechanism according to claim 2, wherein the rubber pressing plate (2) comprises a fixing seat main body (21), a chamfer protrusion (22), a fixing wire hole (23), a fixing pin (24) and a bolt hole (25), the fixing seat main body (21) is located right above the sealing groove (5), and the fixing pin (24) is integrally connected to the peripheral surface of the fixing seat main body (21), the bolt hole (25) is provided at one end of the fixing pin (24) away from the fixing seat main body (21), and the bolt hole (25) is aligned with the screw fixing pillar, the chamfer protrusion (22) are integrally connected to the bottom of the fixing seat main body (21), and the chamfer protrusion (22) abuts against the top of the sealing soft body (3), the fixing wire hole (23) is arranged in the middle portion of the fixing seat main body (21), and the fixing wire hole (23) penetrates through the fixing seat main body (21).

4. The waterproof sealing mechanism according to claim 3, wherein the main body of the sealing soft body (3) is soft rubber (31), the top of the peripheral surface of the soft rubber (31) is provided with a chamfered bevel (32), and the chamfered bevel (32) abuts against the bevel of the chamfer protrusion (22).

5. The waterproof sealing mechanism according to claim 4, wherein the chamfer of the chamfered bevel (32) is smaller than the chamfer of the chamfer protrusion (22).

6. The waterproof sealing mechanism according to claim 4, wherein the fixed pins (24) are five short rods uniformly arranged by taking the axis of the fixed seat main body (21) as the center of a circle, the angle between adjacent fixed pins (24) is 72 degrees, and a reinforcing rib is integrally provided on the body side of the fixed pins (24).

* * * * *